United States Patent [19]
Johnson

[11] Patent Number: 5,456,071
[45] Date of Patent: Oct. 10, 1995

[54] CONTINUOUS CUT KNIFE AND OFF-SET CUTTER GUARD FOR COMBINE

[76] Inventor: W. A. Johnson, 2340 Ampere Dr., Louisville, Ky. 40299

[21] Appl. No.: 254,035

[22] Filed: Jun. 3, 1994

[51] Int. Cl.⁶ .......................... A01D 34/17; A01D 34/18
[52] U.S. Cl. ................................. 56/308; 56/310
[58] Field of Search ............... 56/298, 305, 307, 56/308, 310

[56] References Cited

U.S. PATENT DOCUMENTS

| | | | |
|---|---|---|---|
| 888,491 | 5/1908 | Hampton | 56/305 X |
| 1,085,349 | 1/1914 | Likely | 56/298 |
| 1,917,604 | 7/1933 | Scranton, Jr. | 56/298 |
| 2,080,471 | 5/1937 | Gillette et al. | 56/298 |
| 4,520,618 | 6/1985 | Sorensen et al. | 56/310 |
| 4,530,204 | 7/1985 | Brooks | 56/298 |
| 4,651,511 | 3/1987 | Majkrzak | 56/310 |
| 5,241,811 | 9/1993 | Bolinger | 56/310 |

Primary Examiner—George A. Suchfield
Attorney, Agent, or Firm—Scott R. Cox

[57] ABSTRACT

A continuous cut knife and offset guard system for use with a combine assembly comprised of a support bar, a reciprocating continuous cut knife bar wherein there is secured thereto a plurality of cutting teeth, a series of offset top guards secured to the support bar, each containing a plurality of top guard fingers, and a series of offset bottom guards, each containing a plurality of bottom guard fingers also secured to the support bar, such that the bottom guard fingers align with the top guard fingers and wherein the distance between adjoining cutting teeth is approximately twice the distance between adjoining fingers of the top and bottom guards.

18 Claims, 3 Drawing Sheets

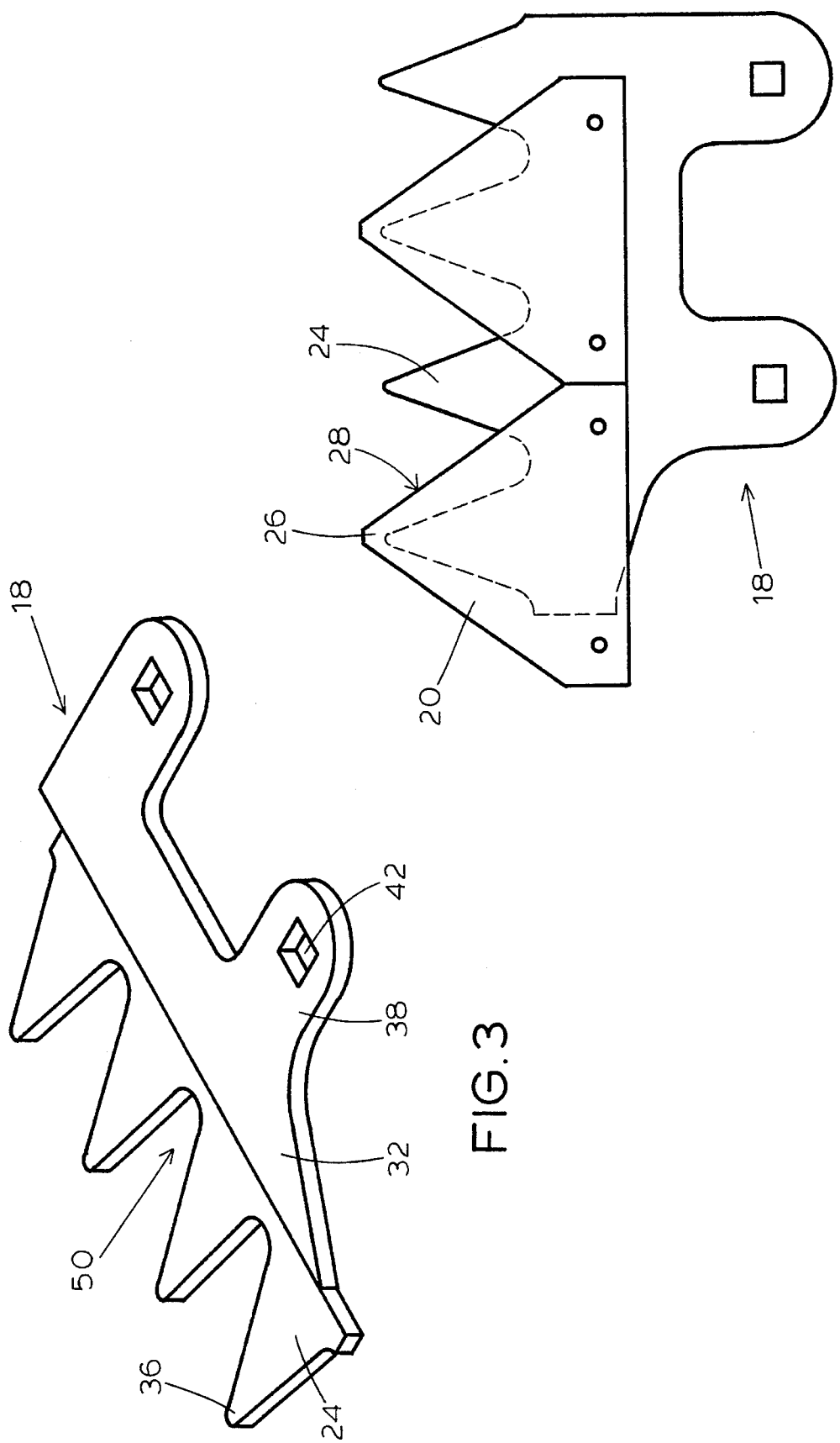

CONTINUOUS CUT KNIFE AND OFF-SET CUTTER GUARD FOR COMBINE

BACKGROUND OF INVENTION

1. Field of Invention

This invention relates to farm equipment. More specifically, the invention discloses an improved arrangement of a continuous cut knife and off set guards for use with a combine.

2. Prior Art

Power operated combines have been widely used for the cutting agricultural products. These combines normally include reciprocating cutting teeth located on cutting knives which are secured to a reciprocating knife bar. The reciprocating knife bar is generally driven with power from the combine, a tractor or from a separate motor. Top and bottom guards or alternatively sickle guards may be secured to a support bar to protect the cutting teeth and assist in the cutting of the agricultural product. The combine assembly which incorporates these elements extends horizontally and laterally outward from the body of the combine and is generally close to the ground for cutting the agricultural product at the stalks.

Two distinct types of assemblies have been designed to overlay the cutting knives secured to the reciprocating knife. The first is a standard sickle guard with fingers which extend over and around the cutting surface of the cutting blade. See, for example, U.S. Pat. Nos. 1,326,339, 1,642,808, 2,024,309, 2,500,104, 3,162,991, 4,909,026 and 5,241,811. Each of these sickle guard systems cut agricultural products by the use of a "wedge" cut, sickle guards above and below the knife hold the products as the knife cuts the products creating a wedge type cut.

An alternative design uses similar reciprocating cutting knives but secures those knives down with hold downs. See, for example, U.S. Pat. Nos. 2,735,254, 3,199,279 and 4,520,618. In these cutter guard combine assemblies, the guards operate in conjunction with the cutter knife to cut the agricultural product by use of a "scissor" cut as opposed to the "wedge" cut used by other mechanisms.

U.S. Pat. No. 4,651,511 combines both the "wedge" cut with a "scissor" cut in its operation. In particular, the short fingers (25) operate in conjunction with the knife section (15) to produce the "scissor" cut while the long fingers (22 and 23) operate in conjunction with the knife section (15) to produce the "wedge" cut.

Over the years manufacturers of combine assemblies using cutter guards have standardized the relative position of the cutter guards with respect to the remaining elements of the combine assembly. The standard cutter guard provides spacing between the guard fingers which is equal to the spacing between the cutting teeth of the cutter knife. In some circumstances this space is 3 inches and in others it is 1½ inches. Regardless of which size cutting knife is used, traditionally the fingers of the cutter guards are corresponding in size. Thus, if a 3 inch cutting knife is used, the distance between the tips of the cutter guards is also 3 inches. In addition, where a 3 inch spacing exists, there is also a standard 3 inch stroke by the reciprocating cutter bar, so that, traditionally, each cutting tooth alternatively moves between the fingers of the cutter guard. Traditionally, the end of a reciprocating cycle will place the tips of the fingers of the cutter guard halfway between the cutting teeth of the continuous cut knife of the combine, thus reducing the effectiveness of the cutting action.

While the prior art patents disclose sickle guards and top and bottom guards for the cutting of crops, there are still problems in the efficient cutting of crops. For example, the existing mechanisms do not allow for the efficient cutting of a crop by permitting multiple cuts for each stroke of the cutter bar. In addition, problems exist because crops may get clogged in conventional cutting mechanisms because of their inefficient design. Finally, because of the size of the space of the conventional opening between the cutter teeth of cutter bars, rocks and dirt or other undesirable materials can become wedged between the guards and the knife assembly, resulting in maintenance problems.

Therefore, it is an object of this invention to provide a continuous cut knife and offset guard assembly for use with a combine and other crop cutting machines.

It is a still further object of this invention to disclose a continuous cut knife and offset guard assembly for a combine which provides continuous cutting of agricultural products.

It is a still further object of this invention to disclose a continuous cut knife and offset guard assembly for a combine which permits additional cutting capability in comparison to conventional combines.

It is another object of this invention to provide a continuous cut knife and offset guard for use with a combine where the distance between the cutting teeth of the cut knife is approximately twice the distance between the fingers of the upper and bottom guards.

It is a still further object of this invention to disclose top and bottom guards wherein the top and bottom guard fingers are offset such that at the end of a reciprocating cycle, the cutting teeth will stop at a position which is in line with the fingers of the top and bottom guard.

It is a still further object of this invention to provide an arrangement of the cutting teeth of the cut knife with the top and bottom guards which continuously cleans the cutting teeth while the combine is in operation.

These and other objects and features of the present invention will become apparent to those skilled in the art from a consideration of the following detailed description, drawings and claims. The description along with the accompanying drawings, provides a selected example of construction of the device to illustrate the invention.

SUMMARY OF INVENTION

In accordance with the present invention there is provided a continuous cut knife and offset top and bottom guards for use with a combine assembly comprised of (1) a cutter bar secured to the combine assembly, (2) a reciprocating, continuous cut knife bar, reciprocatingly secured to the combine assembly, such that the knife bar reciprocates during a cutting cycle, wherein there are secured to the cut knife bar a plurality of cutting teeth, (3) a series of offset top guards, each containing a plurality of top guard fingers, which top guards are secured to the cutter bar, such that at the end of the reciprocating cycle, a portion of the top guard fingers align with tips of the cutting teeth of the continuous cut knives, and (4) a series of offset bottom guards, each containing a plurality of bottom guard fingers, which bottom guards are secured to the cutter bar such that at the end of the reciprocating cycle, the bottom guard fingers align with the top guard fingers. Further, the distance between adjoining cutting teeth of the cut knife bar is approximately twice the distance between top and bottom guard fingers of the top and bottom guard.

BRIEF DESCRIPTION OF THE DRAWINGS

This invention will now be described with reference to the accompanying drawings in which

FIG. 3 is a perspective view of the bottom guard.

FIG. 4 is a superimposed top view superimposing a section of the continuous cut knife over the bottom guard.

DETAILED DESCRIPTION OF THE PREFERRED EMBODIMENT

Figure 1:
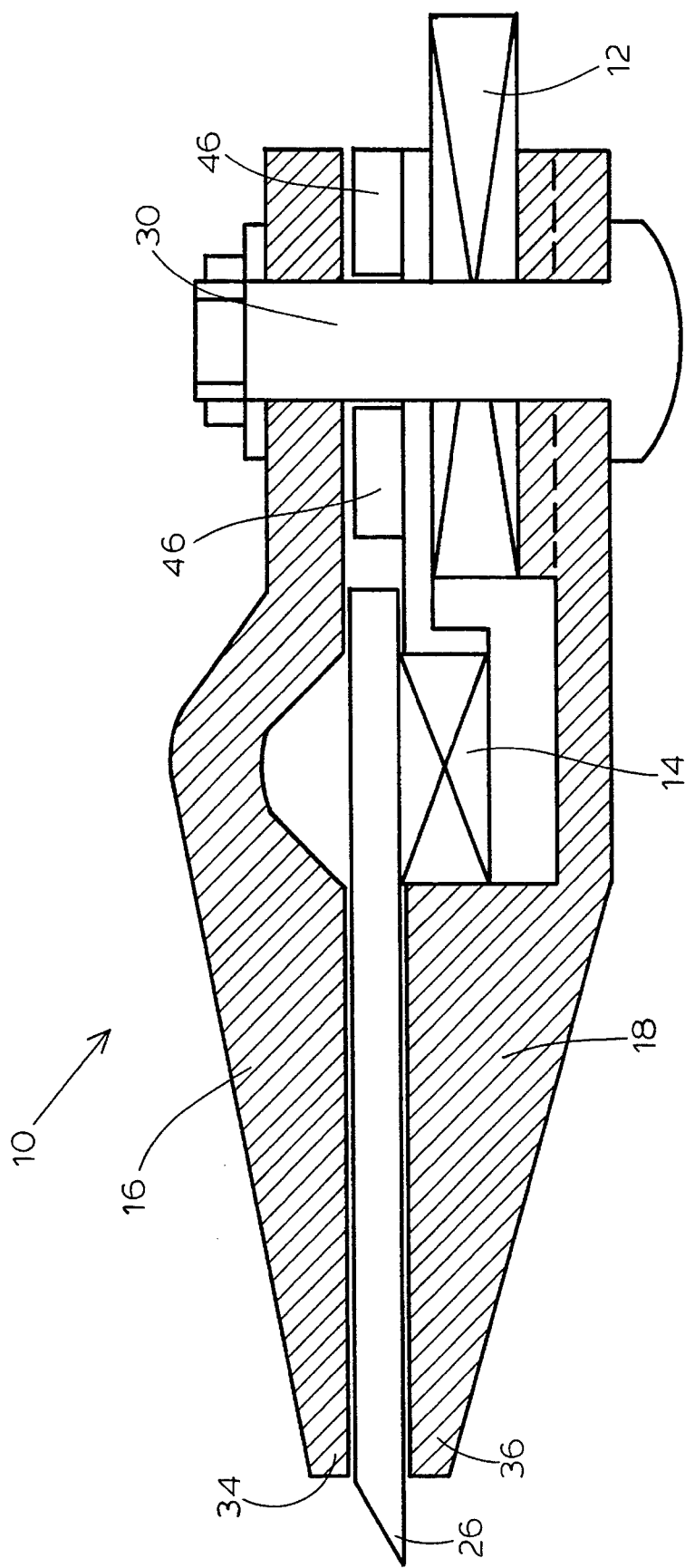
FIG. 1 is a side view of the continuous cut knife and offset guard.

Although the invention is adaptable to a wide variety of uses, it is shown in the drawings for purpose of illustration as embodied in a continuous cut knife and offset top and bottom guard assembly (10) for use with a combine assembly (not shown) comprised of a support bar (12), a reciprocating continuous cut knife bar (14) containing a plurality of cutting teeth (20) secured thereto, a series of offset top guards (16) secured to the support bar (12) and a series of offset bottom guards (18) secured to the support bar (12). See FIG. 1.

The cut knife bar (14) is preferably made of cast iron or steel and is generally flat, elongated and rectangular shaped in cross-sectioned. The cut knife bar (14) is attached to a known and customary drive mechanism (not shown) and is reciprocally driven thereby in a known and conventional manner. Thus, as the cut knife bar reciprocates, cutting teeth (20) secured thereto also reciprocally move, providing the necessary cutting action.

The continuous cut knife bar has secured to it by bolts a plurality of cutting teeth (20). The cutting teeth are generally flat and include a flat back section which is adapted to be secured to the cut knife bar (14) by bolts. Each cutting tooth (20) includes sharp cutting edges (28) for acting with the top and bottom guard (16, 18) to cut the stalk of the agricultural product in a "wedge"-type cut. These cutting teeth (20) are preferably made of hardened steel material for increased life span. Conventionally, the distance between the tips of the cutting teeth can be 3 inches or 1½ inches.

The support bar (12) is generally flat, elongated and rectangular shaped in cross-sectioned. A plurality of holes are provided in the support bar for receiving bolts (30) therethrough for securing the top and bottom guards in position. The support bar is adapted to be mounted on a combine, tractor, or other similar farm equipment, extending outward therefrom horizontally over but close to the ground. To the support bar (12) are secured both the top guards (16) and the bottom guards (18). These are attached to the support bar (12) by bolts (30) secured through the support bar. See FIG. 1.

Figure 6:
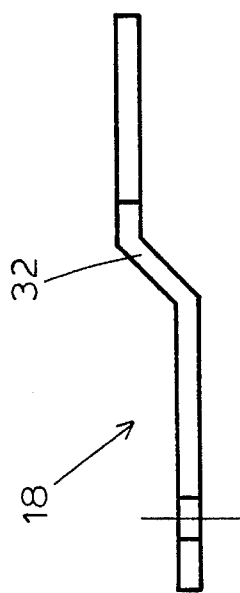
FIG. 6 is a side view of the bottom guard.

The bottom guard (18) is attached to the support bar (12) with bolts (30). The bottom guard preferably has four fingers (24) formed at the end of a generally flat base portion (32) of the bottom guard. See FIGS. 3 and 6. These fingers are preferably triangular in shape. These fingers (24) extend outward over the cut knife bar to provide a guard to protect the cutting teeth of the cut knife bar (14) as they reciprocate. The tips (36) of the fingers of the bottom guard, however, do not extend out beyond the tips (26) of the cutting teeth of the cut knife bar. Preferably, each bottom guard includes four fingers extending forward from the base portion (32) of the bottom guard. As the fingers extend forward, they are also angled upward, thus becoming thinner in cross section. The base portion (32) of the bottom guard is generally flat but angled downward at an angle of about 125°–145° from the bottom guard fingers (24) so that the cut knife bar (14) can move smoothly above said bottom guard. On the opposite side of the elongated base portion from the fingers of the bottom guard are located preferably two extension ears (38), each having a hole (42) therein corresponding with holes in the support bar and adapted to receive a bolt (30) therethrough. Preferably, the ears (38) of the bottom guard align with the tips of the first and third finger of the bottom guard (18). This is an offset arrangement which is different from conventional bottom guards and allows for a different cut of agricultural products which will be discussed in more detail later. Shims (46) may be attached between the extension ears of the bottom guard and the support bar to adjust the relative height of the bottom guard (18) to the support bar (12). Preferably, the bottom guards are made of cast iron or steel.

Figure 2:
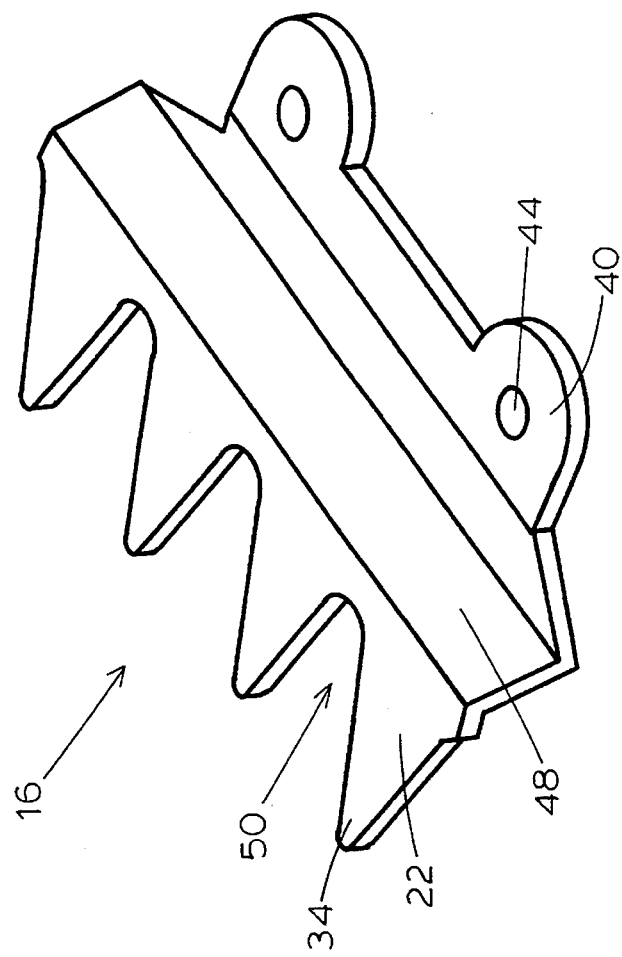
FIG. 2 is a perspective view of the top guard.
Figure 5:
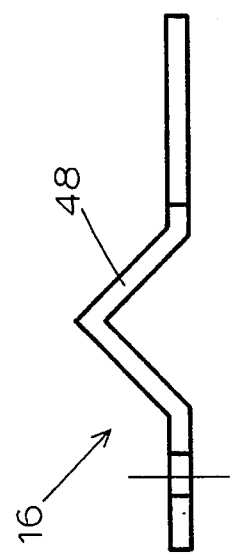
FIG. 5 is a side view of the top guard.

Opposite from the bottom guard is located the top guard (16) which is also attached to the support bar (12) with bolts (30). The shape of the top guard is similar to, but not the same as, the bottom guard, but a mirror image thereof. See FIGS. 2 and 5. The top guard also has preferably four fingers (22) extending from a base portion (48) of the top guard. The fingers (22) of the top guard are generally triangular in shape. These four teeth extend out to cover a substantial portion of the cutting teeth (20) which are secured to the cut knife bar (14). However, just as with the bottom guard, the tips (34) of the fingers of the top guard do not extend out to the tip (26) of the cutting teeth of the cut knife bar. As the fingers extend back from their tips, they are raised to provide a space for the cut knife bar (14) and the bolts which secure the cutting teeth to the cutting knife bar to pass below the top guard. It is not critical that this raised portion of the base portion completely cover the knife cut bar. Corresponding ears (40) having holes (44) corresponding with holes in the support bar and the corresponding ears (38) of the bottom guard (18) extend backward from the base portion. These ears are adapted to receive bolts therethrough to hold both the top guard and bottom guard in place. Preferably, the ears extend backward from alternating fingers of the top guard just as with the bottom guard. See FIG. 2. Preferably, the top guard is also made of cast iron or steel.

Conventionally, the distance between the tips (34, 36) of the fingers of the top and bottom guard is the same as the distance between the tips (26) of the cutting teeth of the continuous cut knife bar. However, it has been discovered that a better cut occurs when the distance between the cutting teeth of the cut knife bar is approximately twice the distance between the fingers (34, 36) of either the top or bottom guards. For example, conventionally the distance between the cutting teeth (20) of the continual cut knife is either 1½ or 3 inches. Accordingly, the corresponding distance between the teeth of the top and bottom guard is also 1½ or 3 inches. It has been also discovered that a better arrangement which produces a continuous cutting operation is achieved if the distance between the cutting teeth is twice that of the distance between the fingers of the top and bottom guards. See FIG. 4. The distance of the reciprocating movement of the cut knife bar will continue to be the distance necessary for the cutting teeth (20) to move one complete cycle. For example, when the preferred 3 inch apart cutting teeth (20) are used, the cutting teeth will move 3 inches to the left and then back to the right during the reciprocating cycle. When the distance between the fingers (22, 24) of the top and bottom guard is only 1½ inches, the effect is that two complete cutting cycles occur during each 3 inch cutting motion. Viewing FIG. 4, as the cutting teeth (20) move to the right, the right cutting edge (28) of each tooth of the cut knife bar (14) will cut the agricultural product against both the first and the second fingers of the top and bottom guard immediately adjacent to the cutting edge of the cutting teeth. Because of this arrangement, agricultural products are continuously cut. In contrast, when the distance between the fingers of the top and bottom guard is the same as the distance between the cutting teeth, no cut occurs when the fingers of the guards overlap the teeth of the cut knife bar. In addition, because of the angle of the sides of the cutting teeth, even when the tips (26) of the cutting teeth overlap the fingers (22, 24) of the top and bottom guard, the cutting edges (28) of those cutting teeth (20) will be cutting the agricultural product against the sides of the uncovered top and bottom guard fingers in a "wedge"-type cut. This arrangement also reduces the likelihood that the cutting teeth (20) of the cut knife will bite into either the bottom (18) or the top guard (16). Further, because the tips (26) of the cutting teeth are extended beyond the tips (34, 36) of the fingers of the top and bottom guard, a continuously cleaning of the teeth of the cut knife bar occurs, thus preventing the buildup of any foreign material during the cutting process.

In addition to the differences in width between the tips of the cutting teeth of the continuous cut knife and the fingers of the top and bottom guard, the top and bottom guard are preferably offset in location. Conventionally, during the reciprocating cycle when the cutting teeth reach the end of their cutting cycle, the tips of the cutting teeth stop at a trough (50) between the fingers of the guards. See, for example, U.S. Pat. Nos. 5,241,811 and 4,520,618. This design makes for an inefficient cutting cycle. This arrangement has been improved upon by offsetting the fingers (22, 24) of the top and bottom guards such that at the end of the reciprocating cycle, the tips (26) of the cutting teeth overlap the tips (22, 24) of the fingers of the top and bottom guard. See FIG. 4. This offset design is achieved by offsetting the ears (38, 40) of both the top guard and the bottom guard from their normal location. As a result, when a four finger bottom and top guard are used at the end of a cycle, the ears effectively extend backward from the first and third fingers rather than extending backward from a trough located between the first and second and third and fourth fingers, respectively. This design is shown by contrasting FIG. 4 with the arrangement shown for example in FIG. 5 of U.S. Pat. No. 4,520,618. Because of their design, these offset top and bottom guards can be used with existing mower assemblies replacing the existing top and bottom guard with the offset top and bottom guard.

As the top and bottom guard (16, 18) are secured in place, appropriate shims (46) may be placed to assure the appropriate distance between the top and bottom guards and the cutting teeth (20) of the cut knife bar. See FIG. 1. The arrangement of the instant invention results in a reduced number of shims and less overall adjustments to the combine.

In operation, the cutting teeth (20) of the cut knife bar (14) reciprocate, preferably through a 3 inch cutting cycle. At the beginning of the cycle, the tips (26) of the cutting teeth (20) secured to the cut knife bar (14) correspond with every other finger (22, 24) of the top and bottom guards. As the cutting teeth of the cut knife bar reciprocate, they produce a full wedge cut, cutting the agriculture product in place. The combination of offsetting of the top and bottom guard and the reduced distance between the tips of the top and bottom guard in relation to the tips of the cutting teeth of the cut knife bar provides for enhanced cutting resulting in fewer problems in operation.

While the present invention has been described in terms of a preferred embodiment, it should be understood that no limitation on the scope of the invention is intended thereby. The scope of the invention includes the variations, uses or adaptations of the invention following the general principles thereof, including such departures from the present disclosure as is known or customarily practiced in the art to which the invention pertains.

I claim:

1. A continuous cut knife and offset guard for use with a combine assembly comprised of
    (a) a support bar;
    (b) a reciprocating, continuous cut knife bar with a plurality of cutting teeth secured thereto which reciprocate during a reciprocating cycle;
    (c) a series of offset top guards, each with a plurality of top guard fingers, wherein each top guard is secured to the support bar such that at the end of the reciprocating cycle, each cutting tooth of the continuous cut knife bar aligns with alternating fingers of each offset top guard, wherein the offset top guard has a pair of ears extending in the opposite direction from its respective fingers with openings therein for securing to the support bar, and wherein the ears align with alternating fingers of that top guard; and
    (d) a series of offset bottom guards, each with a plurality of bottom guard fingers, wherein each bottom guard is secured to the support bar such that at the end of the reciprocating cycle, each cutting tooth of the continuous cut knife bar align with alternating fingers of each offset bottom guard.

2. The continuous cut knife and offset guard of claim 1 wherein the distance between the adjoining cutting teeth of the continuous cut knife bar is approximately twice the distance between the adjoining top guard fingers.

3. The continuous cut knife and offset guard of claim 1 wherein the distance between the adjoining cutting teeth of the continuous cut knife bar is approximately twice the distance between the adjoining bottom guard fingers.

4. The continuous cut knife and offset guard of claim 1 wherein the tips of the cutting teeth extend out beyond the fingers of the top and bottom guard.

5. The continuous cut knife and offset guard of claim 1 wherein the fingers of the offset top guard and the fingers of the offset bottom guard overlap.

6. The continuous cut knife and offset guard of claim 1 wherein each top guard has four top guard fingers.

7. The continuous cut knife and offset guard of claim 1 wherein each bottom guard has four bottom guard fingers.

8. The continuous cut knife and offset guard of claim 1 wherein the offset bottom guard has a pair of ears extending in the opposite direction from its fingers with openings therein for securing to the support bar.

9. The continuous cut knife and offset guard of claim 8 wherein the ears of the offset bottom guard align with alternating fingers of that bottom guard.

10. A continuous cut knife and offset guard for use with a combine assembly comprised of
    (a) a support bar;
    (b) a reciprocating, continuous cut knife bar with a plurality of cutting teeth secured thereto which reciprocate during a reciprocating cycle;

(c) a series of offset top guards, each with a plurality of top guard fingers, wherein each top guard is secured to the support bar such that at the end of the reciprocating cycle, each cutting tooth of the continuous cut knife bar aligns with alternating fingers of each offset top guard; and (d) a series of offset bottom guards, each with a plurality of bottom guard fingers, wherein each bottom guard is secured to the support bar such that at the end of the reciprocating cycle, each cutting tooth of the continuous cut knife bar align with alternating fingers of each offset bottom guard, wherein the offset bottom guard has a pair of ears extending in the opposite direction from its respective fingers with openings therein for securing to the support bar, and wherein the ears of the offset bottom guard align with alternating fingers of that bottom guard.

11. The continuous cut knife and offset guard of claim 10 wherein the distance between the adjoining cutting teeth of the continuous cut knife bar is approximately twice the distance between the adjoining top guard fingers.

12. The continuous cut knife and offset guard of claim 10 wherein the distance between the adjoining cutting teeth of the continuous cut knife bar is approximately twice the distance between the adjoining bottom guard fingers.

13. The continuous cut knife and offset guard of claim 10 wherein the tips of the cutting teeth extend out beyond the fingers of the top and bottom guard.

14. The continuous cut knife and offset guard of claim 10 wherein the fingers of the offset top guard and the fingers of the offset bottom guard overlap.

15. The continuous cut knife and offset guard of claim 10 wherein each top guard has four top guard fingers.

16. The continuous cut knife and offset guard of claim 10 wherein each bottom guard has four bottom guard fingers.

17. The continuous cut knife and offset guard of claim 10 wherein the offset top guard has a pair of ears extending in the opposite direction from its fingers with openings therein for securing to the support bar.

18. The continuous cut knife and offset guard of claim 17 wherein the ears of the offset top guard align with alternating fingers of that top guard.

* * * * *